United States Patent [19]
Ray

[11] 3,823,905
[45] July 16, 1974

[54] WATER HOSE ATTACHMENT HOLDER
[76] Inventor: McNally S. Ray, 3667 S. Van Ness Ave., Los Angeles, Calif. 90018
[22] Filed: Apr. 17, 1973
[21] Appl. No.: 351,878

[52] U.S. Cl.................................. 248/87, 239/276
[51] Int. Cl............................................ A47g 29/00
[58] Field of Search........................... 239/276, 275; 248/75–88

[56] References Cited
UNITED STATES PATENTS

| | | | |
|---|---|---|---|
| 471,156 | 3/1892 | Tinsley | 248/82 |
| 1,763,119 | 6/1930 | Archer | 239/276 X |
| 2,571,388 | 10/1951 | Shanahan | 248/87 UX |
| 2,711,927 | 6/1955 | Miller et al. | 239/276 X |
| 2,852,307 | 9/1958 | Clark | 239/276 |
| 2,942,822 | 6/1960 | Crow | 239/276 UX |

Primary Examiner—Robert S. Ward, Jr.
Assistant Examiner—John J. Love
Attorney, Agent, or Firm—Henry M. Bissell

[57] ABSTRACT

An improved water hose attachment holder is provided which includes a guide member of extended surface area mounted on the upper arm of an elongated rod-like support member having a pointed lower end. The support member bears a projection in the form of a wedged plate to act as a foot brace for inserting the support member into the ground. The guide member defines an elongated attachment-receiving passageway and releasable gripping means. In one form of the guide member, a pair of spaced upstanding wings connected by a base define a pair of apertures aligned to form the passageway, while in another form the guide member comprises a hollow open tube having threaded opposite ends to detachably receive a water hose and the attachment.

3 Claims, 3 Drawing Figures

PATENTED JUL 16 1974 3,823,905
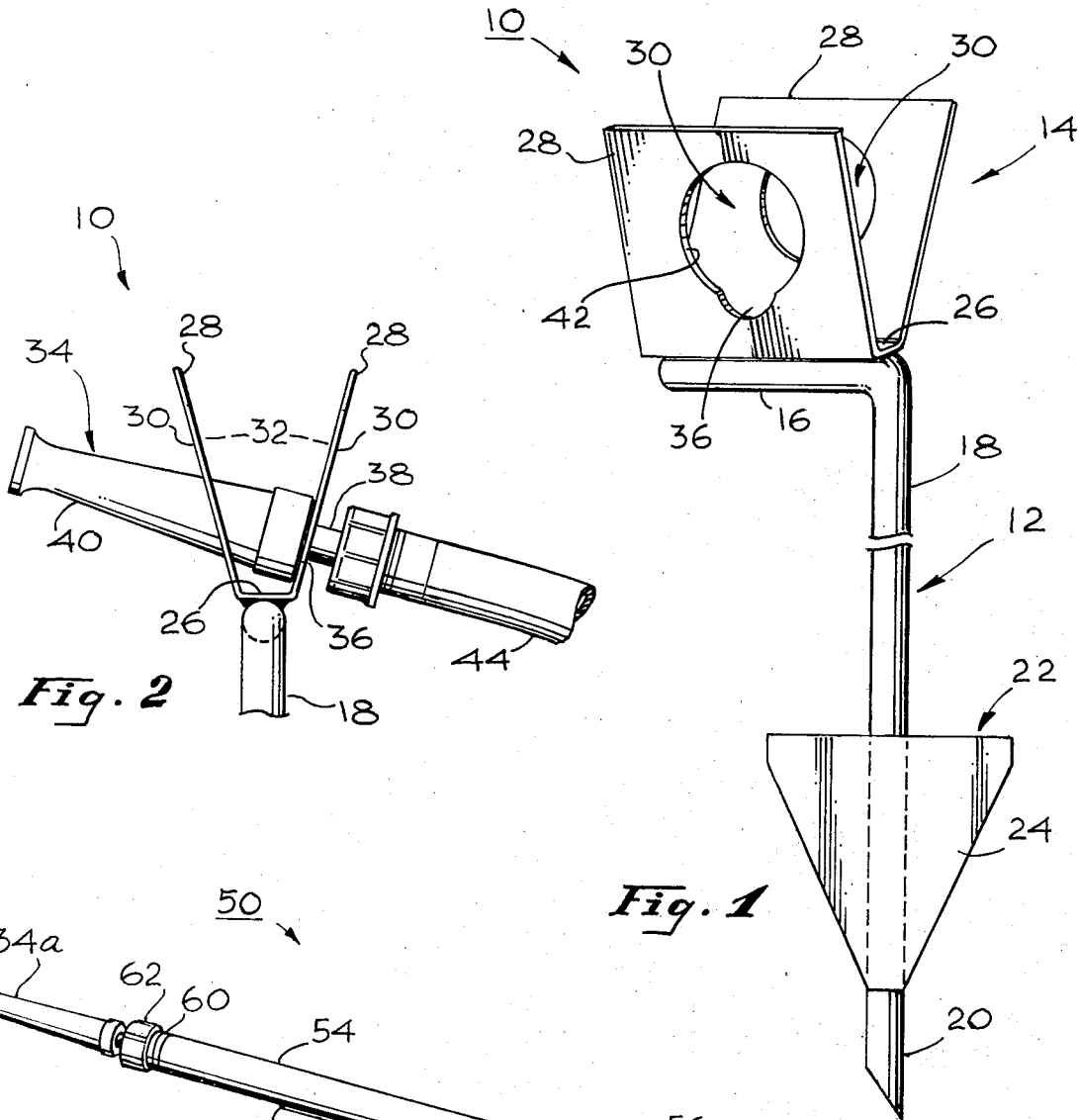
Fig. 1
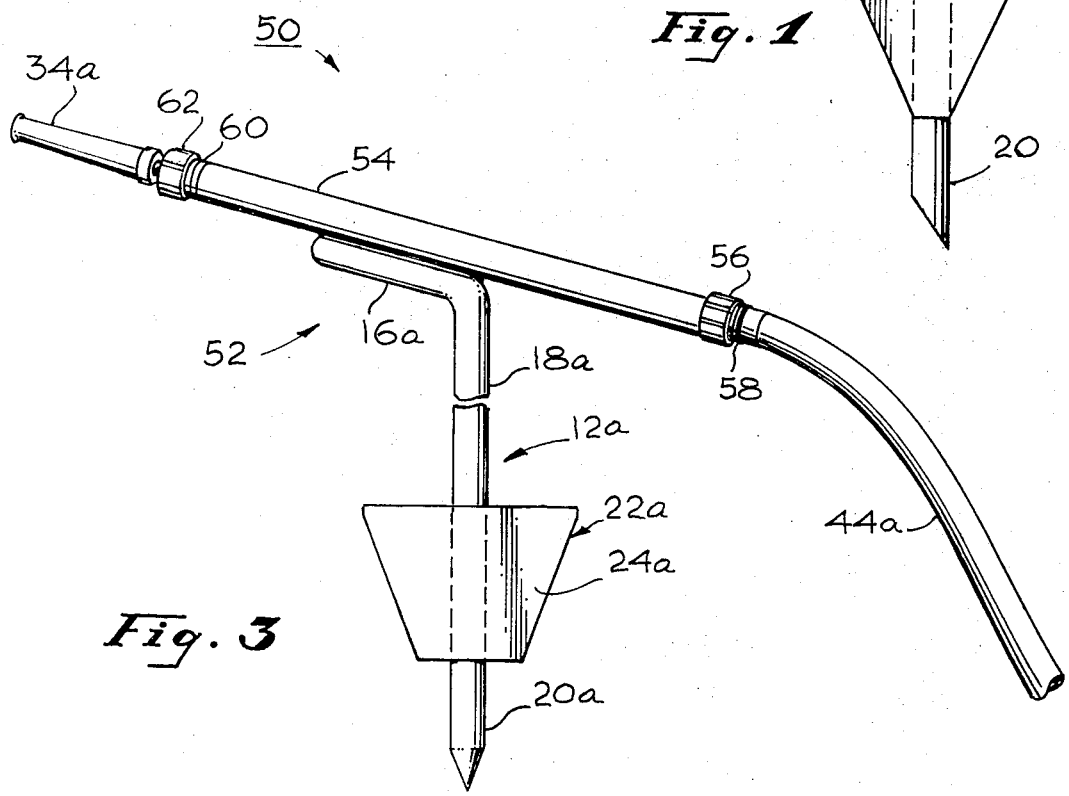
Fig. 2
Fig. 3

WATER HOSE ATTACHMENT HOLDER

BACKGROUND OF THE INVENTION

1. Field of the Invention

The present invention generally relates to holders and more particularly to water hose attachment holders.

2. Description of the Prior Art

Water hose supports and the like generally comprise an elongated ground-engaging spike to one end of which is attached a wire or bracket adapted to grip the hose, leaving the hose attachment, such as a nozzle or the like, to hang free. Such devices do not provide positive support for the attachment. Accordingly, the attachment angle relative to the ground may shift depending on the water pressure in the hose and the consequent stiffness of the hose.

Many conventional hose supports are difficult to engage with and disengage from the hose body and may result in its damage, particularly if the hose is of the relatively thinwalled, inexpensive garden hose type. Much time may be lost in fixing the support in place and in removing it when the hose is needed for other purposes. Moreover, certain of such devices are relatively complicated and expensive to make and repair. Others of such devices are solely adapted to engage hose nozzles of certain sizes and shapes and are not capable of operating when a different type of attachment is connected to the hose to be suspended therewith above ground level.

Accordingly, there is a need for a simple, durable, inexpensive water hose attachment holder capable of efficiently functioning with a wide variety of hose attachments. Such device should be easy and rapid to install and remove and preferably should positively engage the attachment to hold it in any desired position regardless of the water pressure in the hose.

SUMMARY OF THE INVENTION

The foregoing needs are satisfied by the improved water hose attachment holder of the present invention. The holder is substantially as set forth in the Abstract above. Such holder is inexpensive, simple to make, use and repair and capable of being easily and rapidly attached to and detached from a wide variety of attachments commonly used in association with water hoses, including nozzles, spray heads and the like. Since the holder does not directly engage the flexible hose body, it cannot damage it. Instead, the holder positively but releasably engages the attachment, holding it firmly in place to prevent it from shifting during use. Further features of the invention are set forth in the following detailed description and accompanying drawings.

DESCRIPTION OF THE DRAWINGS

FIG. 1 is a schematic perspective view of a first preferred embodiment of the improved water hose attachment of the present invention;

FIG. 2 is a schematic side elevation of the guide member and upper portion of the support member of the holder of FIG. 1, shown with a hose nozzle attached to a hose and releasably secured in said guide member; and FIG. 3 is a schematic side elevation of a second preferred embodiment of the improved water hose attachment holder of the present invention.

DESCRIPTION OF THE PREFERRED EMBODIMENT

FIGS. 1 and 2

As shown schematically in FIGS. 1 and 2, the first preferred embodiment of the present invention comprises a water hose attachment holder 10 having a support member 12 and a guide member 14, the latter attached to an angled arm 16 at one end of the support member 12. Member 12 includes an elongated rod 18 having a pointed lower end 20 for easy insertion into the ground. A projection 22 perpendicular to the longitudinal axis of rod 18 is secured to rod 18 adjacent end 20. Projection 22 serves as a foot brace to aid in inserting end 20 into the ground and in removing it from the ground. Projection 22 is shown in FIGS. 1 and 2 in the form of a wedge-shaped or generally triangular plate 24 with its narrowed lower end facing end 20. It will be understood that projection 22 could be, if desired, a cross-brace or bar or the like.

It will be noted from FIGS. 1 and 2 that arm 16 extends at an angle generally perpendicular to the longitudinal main axis of rod 18 and preferably is integral therewith. It will be understood, however, that arm 16 can be separate from rod 18 and the point of connection between the two can be provided with pivoting means (not shown) or the like, so as to be able to change the angle between arm 16 and rod 18 and hence the angle of guide member 14.

To the upper surface of arm 16 is attached as by welding, nuts and bolts, etc. (not shown) a base 26 which in turn is connected along its opposite sides to the lower ends of a pair of spaced upstanding wings 28. Wings 28 are of extended surface area and may be made integral with base 26. Preferably, wings 28 are bendable so as to be able to change their angle and spacing relative to each other and base 26. As shown in FIGS. 1 and 2, wings 28 may project upwardly and outwardly from one another. Each wing 28 defines a separate aperture 30, the two apertures being aligned with each other to define a passageway 32 therebetween (FIG. 2) for receiving a hose attachment such as nozzle 34 of FIG. 2. Apertures 30 can be made sufficiently large, due to the extended surface area of wings 28, so as to receive a wide variety of hose attachments, such as sprinkler heads, sprays and the like.

Member 14 also includes releasable attachment gripping means in the form of narrowed areas 36 in and adjacent the lower ends of one or both of the apertures 30. As shown in FIG. 2, one of the areas 36 may engage the narrow neck 38 of nozzle 34 while the large head 40 of nozzle 34 projects through the expanded portion 42 of the other aperture 30. The two apertures 30 cooperatively and securely position nozzle 34, preventing it from shifting during use of hose 44 (FIG. 2) while permitting easy disengagement of nozzle 34 from apertures 30.

It will be noted that the angle of inclination of nozzle 34 with the ground can be adjusted by adjusting the depth of engagement of area 36 with neck 38 and also by adjusting the angle of inclination of rod 18 with the ground. Additionally, if arm 16 is pivoted to rod 18 by pivot means (not shown), adjustment of the angle of arm 16 accomplishes the same purpose. Moreover, if wings 28 are bendable, bending of the same can also achieve the desired angle adjustment of nozzle 34.

Since device 10, including guide member 14, does not directly engage or contact hose 44, it cannot damage it or interfere with it. Moreover, device 10 need only be engaged with nozzle 34 or some other hose attachment in order for it to be used. In the engaged position shown in FIG. 2, device 10 steadily holds nozzle 34 at the desired angle above the ground so that water can be sprinkled over a controlled area through nozzle 34 without having to hand-hold hose 44 and nozzle 34 and without requiring the use of complicated automatic sprinklers. Accordingly, device 10 has improved utility over conventional holders. It is also inexpensive since members 12 and 14 can be fabricated of any suitable, durable material, or materials, such as metal, for example, aluminum, iron, etc., plastic wood, composites or the like.

FIG. 3

A second preferred embodiment of the present invention is schematically depicted in FIG. 3. Thus, an improved water hose attachment holder 50 is shown. Those components of holder 50 which are substantially identical to those of device 10 (FIGS. 1 and 2) bear the same numerals, but are succeeded by the letter a. In this regard, holder 50 includes a support member 12a secured to a guide member 52. Support member 12a includes an angled upper arm 16a at the upper end of an elongated rod 18a, the lower end 20a of which rod is pointed for insertion into the ground. A projection 22a, useful as a foot brace, is secured to rod 18a adjacent end 20a and comprises a wedge-shaped plate 24a with the narrow end thereof facing end 20a. Arm 16a, as shown in FIG. 3, may be, if desired, at an angle other than perpendicular to rod 18a.

Member 52 is secured to the upper surface of arm 16a, as by welding or the like, and comprises a hollow elongated open-ended tube 54 of extended surface area and defining a central passageway (not shown). Tube 54 has releasable hose-securing means on one end thereof and releasable attachment-securing means on the opposite end thereof. Such means may include, for example, an internally threaded female member, or tube portion, 56 releasably received over the externally threaded male end member 58 of hose 44a and, at the opposite end of tube 54, an externally threaded male member, or tube portion, 60 to which is releasably secured an internally threaded female end portion 62 of nozzle 34a. Members 56 and 60 can be made integral with and part of tube 54 or can be separately secured to the ends of tube 54, as by welding, threading (not shown) or the like.

Tube 54, members 56 and 60, and the components of support member 12a can be made of any suitable durable materials, such as metal, wood, plastic, composites and the like. Moreover, tube 54 and member 56 and 60 can be made in any suitable size and length to accommodate the usual sizes of hoses and hose attachments.

Device 50 provides a convenient, inexpensive, and desirable way of supporting nozzle 34a or another attachment above the ground for spraying or other functions without any direct contact of device 50 with the main body of hose 44a; accordingly, damage to hose 44a is avoided. Moreover, the construction of device 50 is such that it provides easy interchangeability of attachments without necessitating any dismantling of device 50, a substantial advantage over conventional devices. Direct connection of attachments with member or portion 60 of tube 54 assures that such attachments will be held steadily and firmly in the desired position during delivery of water thereto from hose 44a. Accordingly, device 50 has substantial advantages over conventional water hose support devices.

Various modifications, changes, alterations and additions can be made in the present water hose attachment holders and in the components thereof. All such modifications, changes, alterations and additions as are within the scope of the appended claims form part of the present invention.

What is claimed is:

1. An improved water hose attachment holder, said holder comprising, in combination:
   a water hose attachment guide member comprising a pair of spaced upstanding wings, each said wing defining an aperture, said pair of apertures being aligned to provide an elongated attachment-receiving passageway, said apertures including attachment-gripping means permitting variable angle seating of an attachment therein; and,
   an elongated support member having an angled support arm adjacent one end thereof, said arm engaging said guide member for holding said guide member in an approximately upright position, the opposite end of said support member including ground-engaging means.

2. The improved holder of claim 1 wherein said guide member comprises a plate, wherein the lower portions of said wings are interconnected to a base engaging said arm, and wherein said apertures include adjacent the lower ends thereof narrowed areas comprising said attachment-receiving means.

3. The improved holder of claim 2 wherein said wings are angled upwardly and outwardly from each other and wherein said wings are bendable to facilitate adjustment of the angle of said attachment.

* * * * *